United States Patent [19]

Monk

[11] Patent Number: 5,177,998

[45] Date of Patent: * Jan. 12, 1993

[54] CENTER OF GRAVITY AND MOMENTS OF INERTIA MEASUREMENT DEVICE

[75] Inventor: Michael W. Monk, Marysville, Ohio

[73] Assignee: The United States of America as represented by the Secretary of Transportation, Washington, D.C.

[*] Notice: The portion of the term of this patent subsequent to Nov. 12, 2008 has been disclaimed.

[21] Appl. No.: 152,275

[22] Filed: Feb. 4, 1988

[51] Int. Cl.$^5$ ............................................. G01M 1/12
[52] U.S. Cl. ........................................ 73/65; 73/669; 364/463
[58] Field of Search ............... 73/65, 69; 364/463

[56] References Cited

U.S. PATENT DOCUMENTS 3,040,563 6/1962 Eckles et al. ............................. 73/65
3,418,847 12/1968 Nantz ....................................... 73/65

FOREIGN PATENT DOCUMENTS 2717454 10/1978 Fed. Rep. of Germany .......... 73/65

Primary Examiner—Herbert Goldstein
Assistant Examiner—Elizabeth L. Shopbell
Attorney, Agent, or Firm—Otto M. Wildensteiner

[57] ABSTRACT

A device for calculating the center of gravity (CG) and moments of inertia of a vehicle. The vehicle is driven onto the device and the height of its center of gravity is determined by hanging weights on the device to displace the vehicle's CG from its position without the weights; the height of the CG is then calculated by a simple mathematical formula. The pitch moment of inertia is calculated by aligning its axis perpendicular to the axis of the pivots and allowing the vehicle to swing, then calculating the moment of inertia by another mathematical formula. The roll moment of inertia is calculated by rotating the vehicle 90 degrees, letting it swing, and then using a slighly different formula. The yaw moment of inertia is calculated by lowering the device to the ground and causing the vehicle to oscillate about a pivot point, then calculating the yaw moment of inertia by means of another mathematical formula.

5 Claims, 4 Drawing Sheets

CENTER OF GRAVITY AND MOMENTS OF INERTIA MEASUREMENT DEVICE

STATEMENT OF GOVERNMENT INTEREST

The present invention may be made and used by or for the government of the United States without the payment of any royalties thereon or therefor.

BACKGROUND

Determining the location of the center of gravity of a vehicle, and its moments of inertia about all three axes, is important in determining the stability and hence safety of the vehicle. The higher the CG of the vehicle, the more readily it will tip over when going around a curve. Likewise, the lower its roll moment of inertia the more readily it will tip over when going around a curve.

Once a sufficient number of vehicles have been tested and their CG locations and moments of inertia determined, it will be possible to use this data bank to develop regulations for the handling and stability of passenger cars and trucks. It will also be possible to develop models which simulate the handling of vehicles, which will allow improvements in their design.

Prior art devices are not capable of measuring both CG location and the moments of inertia of a vehicle due to the size and weight of the vehicle. The ability to determine both measurements greatly increases the economy and utility of the present invention. Further, prior art devices for determining CG location and moments of inertia rely on the application of a force or a pressure in the measurement of CG whereas the present invention uses hanging weights to displace the vehicle in measuring the CG. For example, the device shown in U.S. Pat. No. 4,161,876 uses a torsion rod to cause oscillation of the item being tested. It is much easier to get high acuracy using a calibrated weight rather than a pressure or a force; it is also much easier to hang a weight from the frame of the device than to apply a force or pressure to the device.

OBJECTS OF THE INVENTION

Accordingly, it is an object of the present invention to provide a single device that is capable of both measuring the location of the CG and determining the moments of inertia of a vehicle.

It is a further object of the present invention to provide such a device that is easy and economical to construct.

It is a further object to provide such a device that gives increased accuracy in its results.

It is a further object to provide such a device that is quick and easy to operate.

SUMMARY

Briefly, the present invention is a device for measuring the CG and moments of inertia of a vehicle. The vehicle is mounted on the device's platform with its CG approximately over the center of the platform and the hanging angle of the platform is measured. Weights are then added to the torque arms to cause the platform to hang at an angle from its previous position, and the height of the CG is then calculated from these data. Pitch and roll moments of inertia are determined by displacing the platform a few degrees from the vertical and allowing it to swing like a free pendulum and measuring its period, then using this to calculate the moments of inertia. For yaw moment of inertia the vehicle is caused to oscillate about its yaw axis and the moment of inertia is calculated from its period of oscillation.

DESCRIPTION OF THE PREFERRED EMBODIMENT

Figure 1:
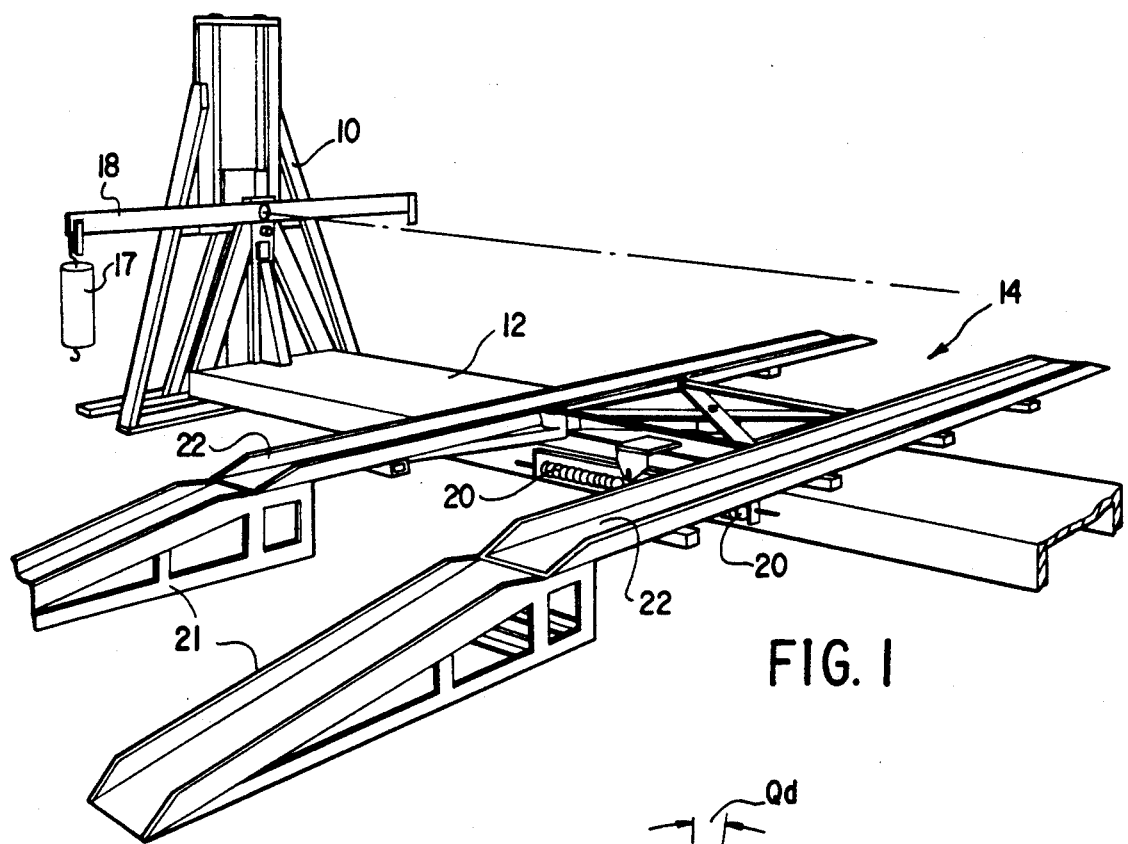
FIG. 1 is an overall view of the device of the present invention.

FIG. 1 shows the device of the present invention. As can be seen, it comprises a pair of end support members 10 (one of which is not shown) which support platform 12 between them. Mounted in the center of platform 12 is a large rotary bearing (not shown) which supports vehicle mount 14 on it; vehicle mount 14 can rotate independently of platform 12 or can be locked in place. End support members 10 contain hydraulic cylinders or other devices 34 for raising platform 12 off the floor. Platform 12 is hung from end support members 10 by pivots 16 which allow it to swing like a pendulum when it is displaced from its rest position. Associated with pivots 16 are means (not shown) for determining the angle of displacement of platform 12 with respect to end support members 10. One such means is a Nicolet Model 4094 digital oscilloscope in conjunction with a Bourns Model 432-102 rotary potentiometer. Pivots 16 preferably contain a large anti-friction bearing such as a Linkbelt self-aligning ball bearing part number PB2244OH; this reduces internal friction in the pivot and thereby increases the accuracy of the measured parameters.

The vehicle being tested rests on vehicle support rails 22 attached to vehicle mount 14. They are adjustable in width to accommodate vehicles of different track widths. The vehicle being tested is driven onto support rails 22 by means of ramps 21, which are then removed for the test.

All of the above members except end support members 10 are preferably made from aluminum in order to reduce the weight of the device so that it will not overshadow the weight of the vehicle under test. End support members 10 are preferably made of steel for strength; since they are stationary at all times their weight is of no concern.

Figure 2:
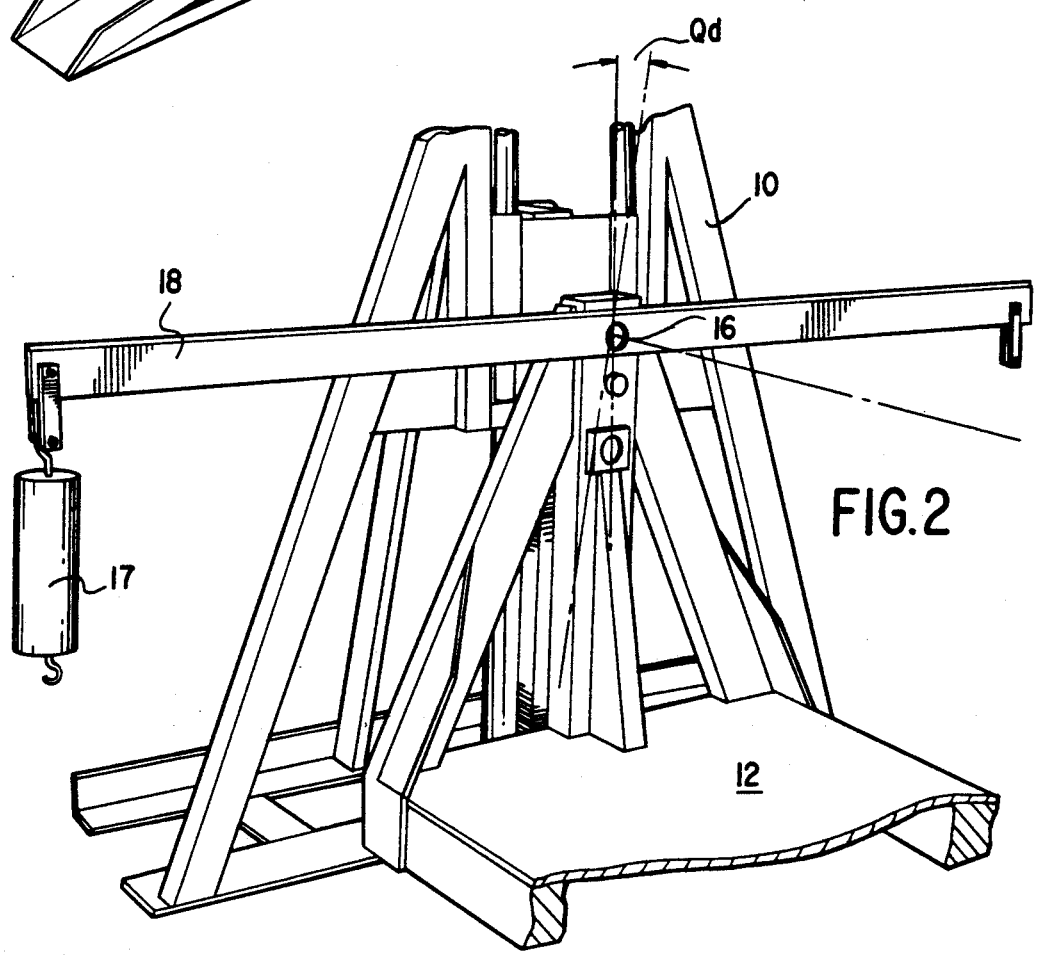
FIG. 2 shows one of the torque arms used to determine CG location.

FIG. 2 shows one of torque arms 18 attached to platform 12. As can be seen it extends the same distance on both sides of platform 12 so that it does not exert a torque due to it-s own weight. Weights 17 of various sizes are hung from one end of arm 18 to determine the height of the CG, as will be explained below. There is a torque arm 18 on each end of platform 12 so that the torque caused by the weights 17 is evenly distributed along platform 12.

Figure 3:
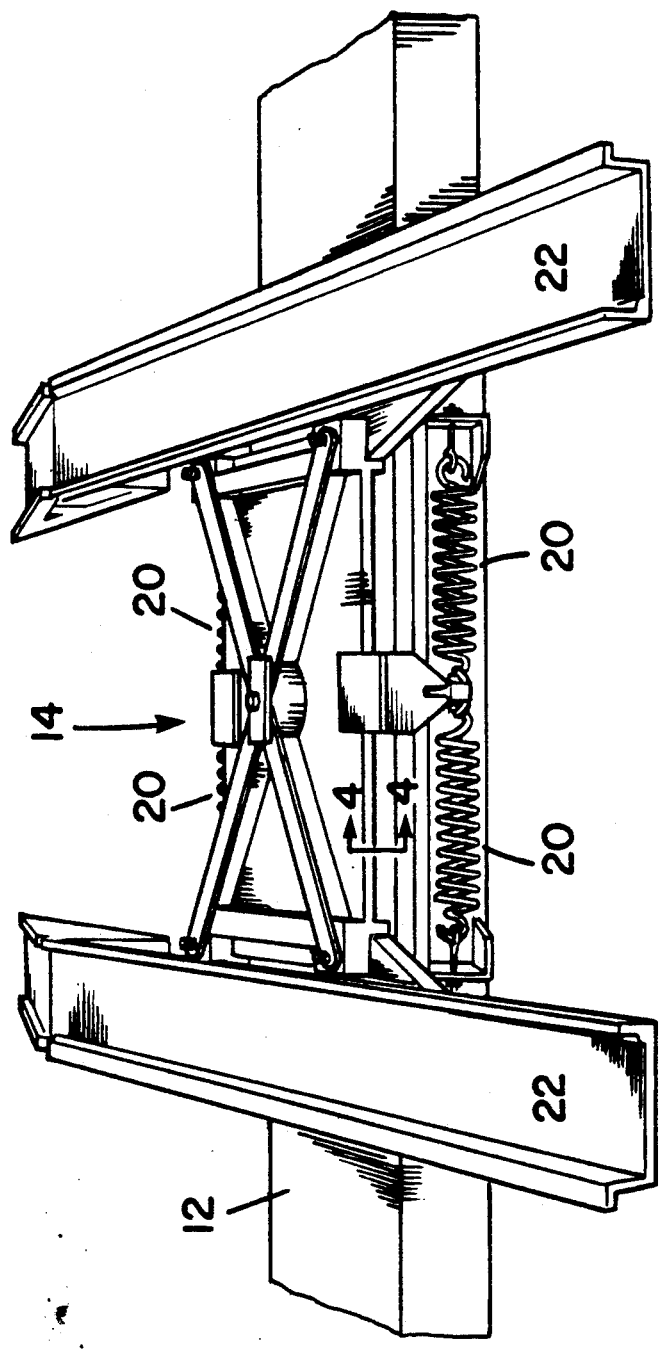
FIG. 3 shows the rotary platform used to determine yaw moment of inertia.

FIG. 3 shows vehicle mount 14 which is mounted on platform 12 and supports the vehicle to be tested. Vehicle mount 14 is attached to a large anti-friction bearing 24 such as a Rotek part number L6-37P9z bearing which allows the vehicle being tested to rotate with respect to platform 12. Vehicle mount 14 has provision (not shown) for locking it in either of two positions displaced 90 degrees from each other; one of these positions is used when measuring CG height and pitch moment of inertia, the other is used when measuring roll moment of inertia. It also can rotate freely, with its rotation opposed by two pairs of springs 20 which are secured in opposition to each other and pre-loaded so that they tend to return vehicle mount 14 to its original position when it is rotated; this is used when measuring yaw moment of inertia. Vehicle mount 14 must also have provision for recording the rotational angle of displacement of the vehicle with respect to platform 12, which can be a digital oscilloscope and rotary potentiometer as is used with pivots 16.

Figure 4:
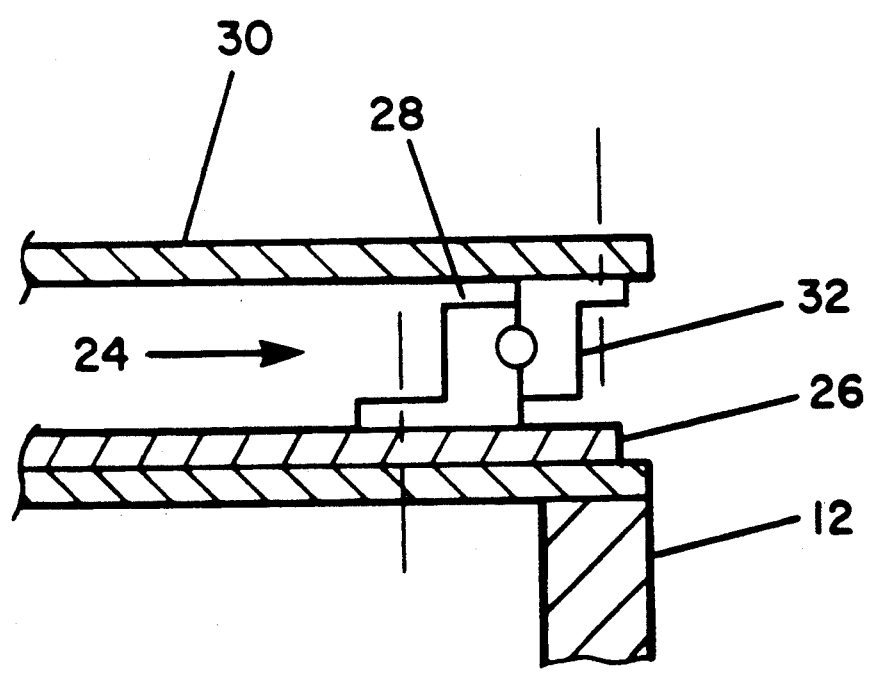
FIG. 4 shows the bearing which supports the vehicle mount for rotation.

FIG. 4, which is taken along line 4—4 of FIG. 3, shows how vehicle mount 14 is supported on platform 12 for rotation by bearing 24. Bottom mount plate 26 is attached by bolts or otherwise to platform 12 and inner race 28 of bearing 24 is attached to bottom mount plate 26. Top mount plate 30 is attached to outer race 32 of bearing 24, and vehicle mount 14 is attached to top mount plate 30. In this manner, vehicle mount 14 can rotate about the center of bearing 24.

Figure 5:
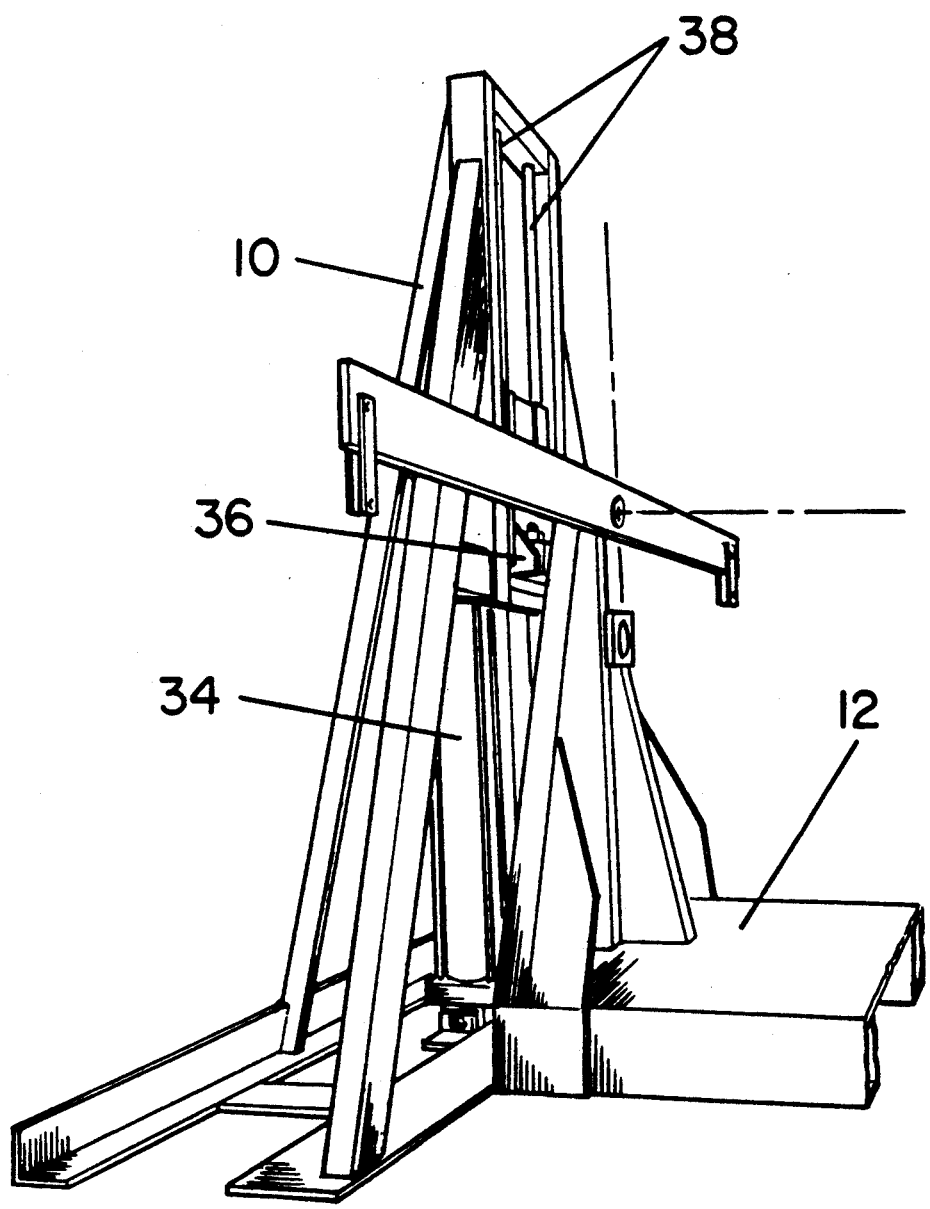
FIG. 5 shows one of the hydraulic cylinders which raise the platform off the floor.

FIG. 5 shows one of the hydraulic cylinders which raise platform 12 off the floor for determining the vehicle's lateral and longitudinal moments of inertia. There is a hydraulic cylinder 34 in each end support member 10. Support block 36, which is raised up by hydraulic cylinder 34, rides on guide shafts 38 and supports one end of platform 12. When platform 12 is raised off the floor by hydraulic cylinders 34 it can then swing like a pendulum about pivots 16 as stated before.

Operation of the device is as follows. Prior to placing a vehicle on the device certain measurements must be made. These are Qd, which is the hanging angle of platform 12 when weights are placed on the torque arms, and Wd, the weight of platform 12. After the vehicle is placed on platform 12 Hr, the distance of the tops of vehicle support rails 22 from the centerline of pivots 16 when platform 12 is in the full up position, must be measured. In addition, the system has to be calibrated; this is done by putting a weight on platform 12 in place of a vehicle and then calculating the CG height and moments of inertia of the weight. Further, the moments of inertia of the device must also be calculated so that they can be subtracted from the total moments of inertia that are calculated in order to leave just the vehicle's moments of inertia.

Vehicle mount 14 is locked in place and the vehicle to be tested is driven up ramps 21 and onto vehicle support rails 22 which are adjusted for its particular width; for CG height and pitch moment of inertia measurements the vehicle's axis must be perpendicular to the centerline of platform 12. The vehicle is then moved back and forth until its CG is approximately over the centerline of platform 12. This is determined by lifting platform 12 off the floor by means of the hydraulic cylinders or other means in end support members 10 and checking the angle at which platform 12 hangs. An angle of 0.25 degrees would place the vehicle's CG within about 0.05 inches of this line, which is acceptable for most purposes. This location is then marked on the side of the car. It is assumed that the CG is on the longitudinal centerline of the vehicle since most vehicles are approximately symmetrical about their longitudinal centerline.

The height of the CG above platform 12 is determined by raising platform 12 to its full up position and recording the hanging angle Qi. The deflection of platform 12 due to the weight of the vehicle is determined by raising platform 12 until the center of it, directly under vehicle mount 14, is just slightly off the floor; the height of either end above the floor is then measured. The height Hp of the centerline of pivots 16 above the floor when platform 12 is in the full up position is also measured. Next, calibrated weights such as 17 in FIG. 2 are hung from torque arms 18 and the hanging angle Qt is recorded. The distance from the line connecting the pivots to the CG of the entire system (i.e. the vehicle plus platform 12), Hs, is then calculated as follows:

$$Hs = \frac{TT}{Ws[\tan Qs]}$$

where:
Ws = system weight (platform 12 plus vehicle)
Qs = Qt minus Qi
Qi = initial hanging angle
Qt = hanging angle with torque applied
TT = torque applied The distance from the line connecting pivots 16 to the vehicle CG is then calculated as follows:

$$Hv = \frac{TT}{Wv} \left[ \frac{1}{\tan Qs} - \frac{1}{\tan Qd} \right] - \frac{(Wd)d}{2Wv}$$

where:
TT = applied torque
Wv = vehicle weight
Qd = hanging angle with weight only
Wd = platform weight without vehicle
d = deflection of platform due to vehicle Finally, the height of the CG above the ground (for the vehicle stationary and on a level road), Hcg, is determined as the difference between the distance between the centerline of pivots 16 and the top of vehicle support rails 22, Hr, and the distance between the vehicle CG and the centerline of pivots 16, Hv, or $$Hcg = Hr \text{ minus } Hv.$$

The moment of inertia in the pitch direction is determined by having the vehicle on vehicle support rails 22 as for the CG height measurement. Platform 12 is manually displaced a small amount (5-10 degrees) and released, allowing it to swing back and forth through a small arc while recording the period of oscillation in seconds. Pitch moment of inertia is then calculated as follows:

$$Ip = Is - Id - Mv(Hv)^2$$

where:
Is = system inertia, device and vehicle
Id = inertia of test device
Mv = mass of vehicle = weight/32.17 and:

$$Is = \frac{T^2(Ws)(Hs)}{4(3.1416)^2}$$

where: T = period of oscillation in seconds

The moment of inertia in the roll direction is calculated the same way as the pitch direction except that the axis of the vehicle must be parallel to the line connecting pivots 16 (i.e. the vehicle is rotated 90 degrees on vehicle mount 14). Note that the moment of inertia of the test device for this calculation will be different, since the orientation of vehicle support rails 22 will be different.

To measure yaw moment of inertia platform 12 is lowered to the floor and vehicle support 14 is unlocked so that it can rotate. Springs 20 are then attached to vehicle support 14. The vehicle is then manually displaced a few degrees and released and the period of oscillation (caused by the action of springs 20) is measured. The yaw moment of inertia is calculated as follows:

$$Iy = \frac{kT^2}{4(3.1416)^2} - Id$$

where:
k = spring constant of springs 20
T = period of oscillation
Id = yaw moment of inertia of device without vehicle Thus the device of the present invention quickly and accurately measures the location of the center of gravity of a vehicle and its moments of inertia about all three axes. Although it has been described and claimed for use with an automobile it obviously can be used to make these measurements on any large or bulky item including trucks.

What is claimed is:

1. A device for measuring the moments of inertia of an automobile and the height of that automobile's center of gravity above the floor, comprising: a platform means for resting said platform on the floor or raising said platform above the floor; means for mounting an automobile on said platform; means for rotatably suspending said platform above the floor so that it can oscillate about a horizontal axis; and means for changing the angle at which said platform is suspended above the floor.

2. A device as in claim 1 including means for allowing the automobile to oscillate about its vertical axis when said platform is on the floor.

3. A device as in claim 2 wherein said means for changing the angles at which said platform is suspended above the floor comprises calibrated weights that are hung from the device.

4. A device as in claim 3 wherein said means for allowing the automobile to oscillate about its vertical axis is a rotatable member mounted on said platform.

5. A device as in claim 4 wherein the rotation of said rotatable member is opposed by pairs of springs which tend to keep said rotatable member fixed in place.

* * * * *